United States Patent [19]

Zimmer

[11] Patent Number: 4,610,456
[45] Date of Patent: Sep. 9, 1986

[54] KNEE MOUNTED SERVICE STEP FOR TWO-WHEEL DRIVE TRACTOR

[75] Inventor: Myron P. Zimmer, Waterloo, Iowa
[73] Assignee: Deere & Company, Moline, Ill.
[21] Appl. No.: 773,485
[22] Filed: Sep. 9, 1985
[51] Int. Cl.[4] .............................................. B60R 3/00
[52] U.S. Cl. .................... 280/165; 180/900; 182/90
[58] Field of Search ............ 280/165, 166, 164 R, 280/164 A, 163, 169; 182/90, 127; 180/900

[56] References Cited

U.S. PATENT DOCUMENTS 4,442,477 4/1984 Hennessey ..................... 280/164 R

FOREIGN PATENT DOCUMENTS 8915 3/1900 Norway ............................. 280/163

OTHER PUBLICATIONS

John Deere Marketing Information Bulletin, No. R-8-3-9, dated 13 Apr. 1983, pp. 1, 2, 4 & 5.

*Primary Examiner*—David M. Mitchell

[57] ABSTRACT

A service step for use on a two-wheel drive tractor of the wide front axle type. The step is mounted on the knee portion below the front axle to provide a convenient and safe foothold for the operator when servicing the top front end of an engine housing. This step does not interfere with crop clearance area beneath the axle and does not require any additional width for the knee and tire assembly. This step is made useable by rotation of the front wheels in a direction away from the step. The step is also adapted to be used in conjunction with a handle located on the vehicle chassis.

11 Claims, 4 Drawing Figures

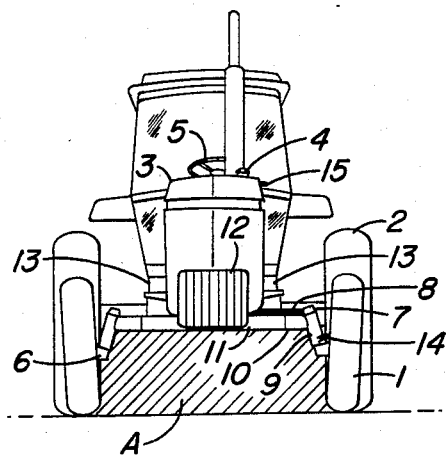
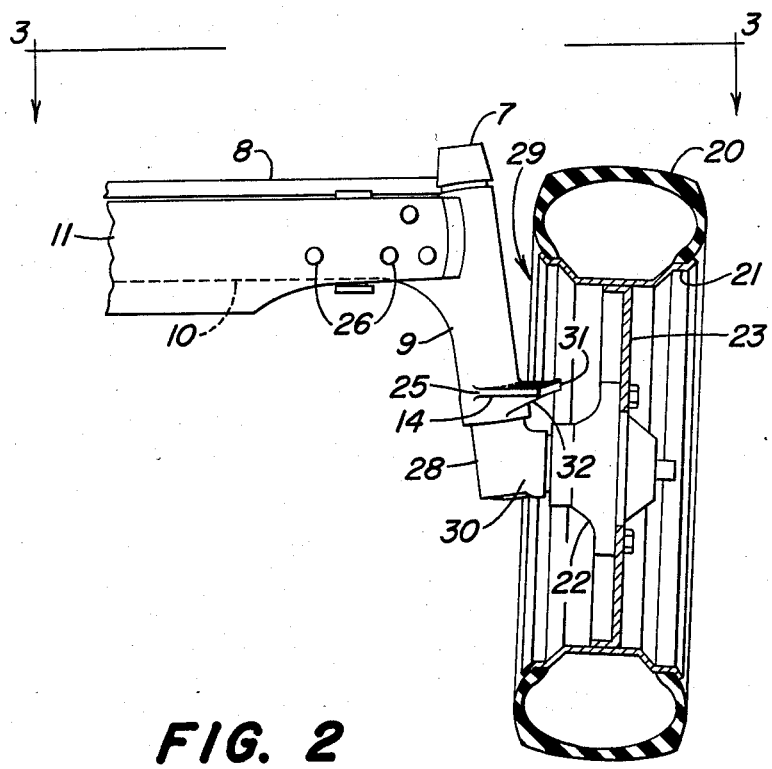
FIG. 1
FIG. 2

KNEE MOUNTED SERVICE STEP FOR TWO-WHEEL DRIVE TRACTOR

FIELD OF ART

This invention relates broadly to hand hold or foot hold attachments for a tractor. More specifically, this invention relates to a service step mounted on the knee portion of a two-wheel drive tractor having a wide front axle arrangement.

BACKGROUND OF THE INVENTION

The typical front wheel drive tractor has one or more service points such as the gasoline inlet or coolant inlet, located on the top front portion of the engine housing. As a result, the tractor operator or someone servicing the tractor must routinely gain access to the top front portion of the vehicle. At the present time, there is no convenient way to get to this portion of the vehicle, which may be 6 or more feet off the ground. Bringing along a stool or ladder to stand on is inconvenient and often impractical when the tractor is in the field. Therefore, an operator or someone servicing the tractor will use the tractor body, front wheel, or steering elements of the tractor to gain access to the upper portion of the vehicle.

Consequently, the typical method of servicing finds the operator standing on the front wheel or front axle of the tractor. On many row crop tractors and on high clearance tractors, the front axle or tire may be several feet or more off the ground. On such tractors, the operator will attempt to step up to the top of the front axle or tire by using the wheel rim or hub as a foot hold, a very inconvenient procedure.

The problems of gaining access to the front of the vehicle are further complicated by the arrangement of the front axle and steering components and the presence of additional equipment both of which restrict access to the front of the tractor. In addition to making access difficult, the wide front axle arrangement and equipment attachment poses additional problems in providing a foot hold or step to improve access. The usual front axle arrangement has the front wheel supported from a generally vertical knee having a small outward slope from top to bottom. The knee is attached at its upper end to an adjustable axle section which bolts to the main portion of the front axle. When desired, the adjustment between the front wheels may be made very narrow providing little room between the front wheels and the outside of the vehicle chassis. In most cases, access to the axle from the rear of the tractor is prevented by a steering arm that projects out from the top of the axle to the rear of the tractor. In looking at the front of the tractor for access, the front counterweights used to adjust the weight distribution on the tractor are in close proximity to the wheels thereby providing additional interference. Finally, the clearance between the front wheel and the vehicle chassis is further restricted at times by the addition of equipment to the front end such as loaders or cultivators which are bolted onto the outside of the frame thereby extending its width. Thus, in many instances, access to the front of the tractor front axle is extremely restricted.

One means of making the general area of the front axle more accessible is to turn the front wheels outward thereby increasing the open area in the vicinity of the front axle. This method has been used particularly on front-wheel drive tractors having steerable front wheels with service steps added to the front axle of such tractors to further facilitate servicing the front end of the engine housing. However, this method, in the addition of a step to the front axle, does nothing to help one get from the ground to the axle or tire.

For two-wheel drive tractors which have a knee portion, the addition of a step to the lower portion of the knee would greatly facilitate access to the top of the front axle or wheel. Up until now, service steps have not been added to the knee portion due to clearance requirements and the close proximity of the inner portion of the wheel to the knee. In regard to clearances, it is unacceptable to have any projection from the knee extending into the area below the front axle and between the tractor knees. This area must be kept clear to prevent damage to emerging crops when the tractor is driven between crop rows. In addition, the wheels are purposely spaced close to the knee to reduce the overall profile of the knee and tire assembly thereby keeping the overall tire path area to a minimum. Accordingly, attachment of a service step to the lower portion of the tractor knee was thought to have limited utility due to the apparent lack of clearance. It has now been found that a useable service step which provides sufficient area for convenient access to the front axle or wheel, despite the presence of front end equipment, can be located on the knee portion of the tractor without decreasing crop clearance or increasing the wheel and knee profile.

SUMMARY OF THE INVENTION

Accordingly, it is an object of this invention to provide convenient access to the front axle of a two-wheel drive tractor.

It is a further object of this invention to provide a service step on the knee portion of a tractor which will not interfere with crop clearance or increase the profile of the wheel and knee assembly.

A further object of this invention is to provide a step that is simple in design and requires no special supporting elements.

These objectives have been achieved by providing a service step on a tractor knee positioned to enter the inner portion of a wheel rim, as hereinafter described, at least during certain turning maneuvers and which is made useable by moving the front wheels to a turning position. Therefore, in one embodiment, this invention is directed to a service step supported on the knee of a two-wheel drive tractor with the surface of the step lying below the front axle and above the knuckle and having a sufficient area for supporting an operator's foot when the wheels are rotated in a direction away from the step. All portions of the step are located outside the crop clearance area between the knees and under the front axle.

In a more limited embodiment, this invention consists of a service step for a two-wheel tractor having a wide front end with the service step comprising a horizontal surface located on the knee portion of the tractor below the front axle. The step surface is made up of an attachment or attachments to the knee portion with the attachments lying outside the area between the tractor knees and on a side of a knee opposite a steering arm. The projection of the attachments are sufficient to provide adequate surface area to hold a person's foot when the wheel is rotated away from the step, but limited to avoid contact with the adjacent front wheel and all wheel supporting elements in any steering position.

Other embodiments of this invention consist of particular step locations, constructions, and attachment methods.

BRIEF DESCRIPTION OF THE DRAWINGS

FIG. 1 is a front view of a tractor showing the knee and wheel arrangement.

FIG. 2 is a front view of a knee and wheel showing a portion of the front axle with a vertical section through the wheel.

DETAILED DESCRIPTION OF THE PREFERRED EMBODIMENT

Figure 3:
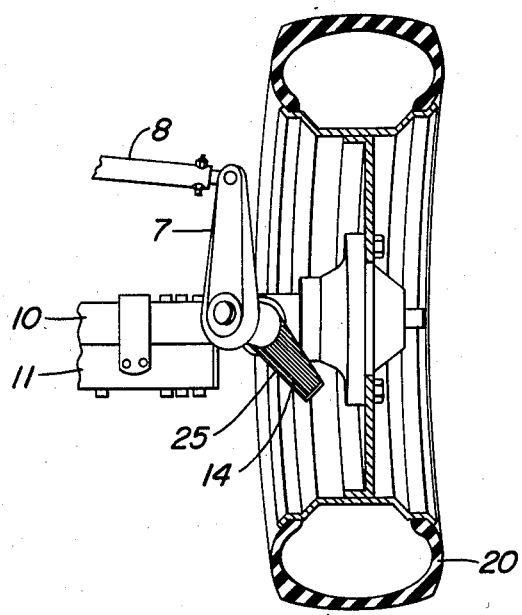
FIG. 3 is a top view of the knee and wheel of FIG. 2 showing a portion of the front axle and the wheel in a straight-ahead position with a horizontal section through the wheel.

Looking first at FIG. 1, the advantageous location of the service step 14, and the general location of a handle 15 which may be used in conjunction with the service step, can be more fully appreciated along with the various elements and clearance areas which interfere with access to the front end of the tractor and location of a service step. In FIG. 1, wheel 1 is shown attached to knuckle and king pin assembly 6 which is pivotally mounted in knee 9, the pivotal movement of which is determined by steering arm 7 and tie rod 8. In this position, front wheel 1 is directly in line with rear wheel 2 with the knee 9 and wheel 1 completely contained within the profile of wheel 2. Knee 9 is attached to knee extension 10 which is adjustably mounted onto axle 11. Axle 11 is underneath vehicle chassis 3. A fluid inlet 4 extends from the top of vehicle chassis 3 in the area of the engine (not shown). Directly behind the engine portion of the vehicle chassis is the operator's station 5 and directly in front are counterweights 12. To the sides of the vehicle chassis are located side frames 13.

Referring again to FIG. 1, the area for crop clearance, hereinafter referred to as the knee clearance area, is shown by the cross hatched area A which is bounded by the innermost knee or wheel portion on the sides and the axle and ground on the top and bottom respectively. For the purpose of this application, the term wide front axle arrangement refers to a tractor having a clearance area A between the front tires. It is area A that must be kept clear of any projection from the service step in order to avoid damage to crops which the tractor may be passing over. Since this area is bounded by the inner portion of the knee, increasing the total width of the knee and front wheel will result in a reduction of the inside area or an increase in the overall knee and front wheel profile with a corresponding increase in the crop row spacing. Moreover, increasing the distance between the wheel and the knee to accommodate the service step causes an undesirable increase in stresses within the knuckle and knee.

FIG. 1 also illustrates how positioning of various elements generally restrict access and the location of a service step. Positioning the front wheels close together will restrict access to service step 14 by narrowing the space in which an operator may squeeze between the vehicle chassis and the front wheel. The restriction posed by the chassis is extended forward by the addition of weights 12. An extreme case of access restraint exists when other equipment has been added to side frames 13. The angle configuration of the knee adds to the difficulty of positioning a service step thereon since the minimum available space for locating a service step is at the lower end of the knee where a step is most useful while the available space increases at locations higher on the knee which are less useful in obtaining access to the front axle.

A more complete understanding of the relationship of the service step to the front wheel can be obtained from FIG. 2. In this figure, knee 9 is shown attached, by means of knee extension 10, to front axle 11 by bolts through holes 26. Service step 14 is shown as a flat plate portion integrally cast to the bottom of knee 9. Attached to the service step is an outer lip 31 and a support gusset 32. Inner side 25 of the service step is rotated away from the knee clearance area. On the opposite side, service step 14 is shown extending into the inner wheel area. The inner wheel area is that volume enclosed by rim 21, wheel disc 23 and inner wheel profile line 29. Rim 21 supports tire 20 and is in turn supported by wheel disc 23. Wheel disc 23 is bolted to hub 22 which is rotatably mounted on wheel knuckle 30. Knuckle 30 is at the bottom of a king pin 28. King pin 28 passes through the hollow interior of knee 9 and is capable of pivotal movement controlled by rearwardly extending steering arm 7 attached to the top of king pin 28. The bottom position for service step 14, as demonstrated in FIG. 2, is preferred since it provides the maximum clearance room within the inner wheel area and will usually be at a location close to midway between the ground and the front axle or wheel. Nevertheless, higher knee locations for the step may be used. In these higher locations, reduced clearance within the wheel area is offset by increased clearance between the wheel and knee.

Figure 4:
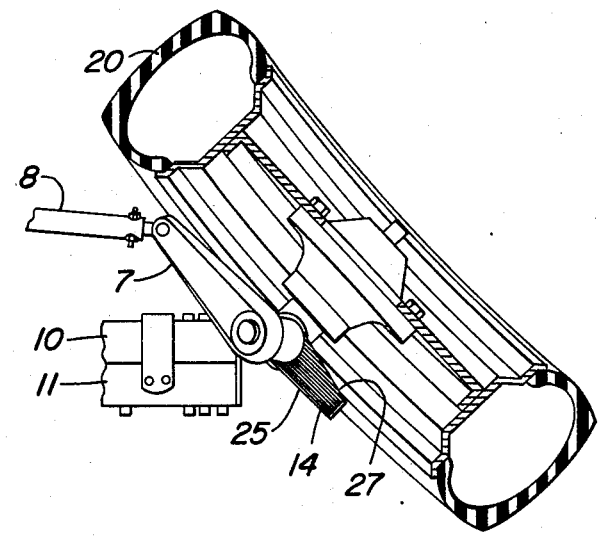
FIG. 4 is a top view of the knee and wheel assembly similar to FIG. 3 but showing the wheel in a full left turn position.

Use of the service step is explained in conjunction with FIGS. 3 and 4. FIG. 3 is the corresponding top view of FIG. 2 and again shows step 14 terminating with innermost side 25 bordering the knee clearance area while the opposite side extends into the inner wheel area. Even with step 14 extending into the rim area, there is still adequate clearance for the wheel to rotate from a full right to a full left turn position. However, it can be seen that with the wheel in a straight ahead position, only a relatively small portion of the step lies outside the inner wheel area and would therefore be difficult to use as a means of access to the front axle or tire. FIG. 3 also has step 14 placed generally opposite to steering arm 7 since the rearwardly extending arm would prevent access to a step located on the same side of the knee as the arm.

In FIG. 4, steering arm 7 has been rotated counterclockwise thereby rotating the front wheel to a left-hand turn position. In this position, an increased area of service step 14 is now available for the operator to stand on. In addition, the outward angle of the king pin further facilitates access and useability of the step by inclining the wheel away from the step. Although FIG. 4 shows outer side 27 of the service step completely outside the inner wheel area, side 27 could extend any distance around the knee provided it does not project into the knee clearance area on the opposite side.

FIGS. 1–4 and the foregoing description are related to a particularly preferred embodiment of this invention. However, it is readily appreciated by those skilled in the art that the step herein disclosed is susceptible to many variations and adaptable to other knee configurations. Although the service step has been shown as an integrally cast plate in the preceding figures, it is readily appreciated that this step may be formed by a plate, a series of bent bars or a rod bent into an arcuate shape. Whatever its configuration or material of construction, this service step component or components may also be bolted or welded to the tractor knee. Moreover, limitations on step location posed by the steering arm only arise where the steering is controlled by an arm generally parallel to the wheel direction. Therefore the description is not meant to limit this invention to the particular details disclosed therein.

I claim:

1. A service step for a two-wheel drive tractor having a wide front end comprising a front axle with substantially vertical knees attached to each end and each knee pivotally supporting a knuckle and king pin assembly which extends generally outward with respect to the tractor chassis, said knuckle having a hub and wheel rotatably mounted thereon, said service step comprising a substantially horizontal surface supported on said knee with said surface: lying below said front axle; above said knuckle; outside a front axle clearance area extending between the knees; out of contact with any portion of said hub, wheel and knuckle in any steering position; and having sufficient area to support a person's foot thereon when said wheel is rotated in a direction away from said surface.

2. The step of claim 1 wherein said horizontal surface comprises a flat plate.

3. The step of claim 2 wherein said step is integrally cast onto said knee.

4. A service step for a two-wheel drive tractor having a wide front end comprising a front axle with substantially vertical knees attached to each end and each knee pivotally supporting a knuckle and king pin assembly which extends generally outward with respect to the tractor chassis, said knuckle having a hub and wheel rotatably mounted thereon with the pivotal movement of said knuckle and king pin about said knee controlled by a steering arm, said service step comprising a substantially horizontal surface supported on said knee with said surface: lying below said front axle; above said knuckle; generally radially opposite said steering arm; outside a front axle clearance area extending between the knees; out of contact with any portion of said hub, wheel and knuckle in any steering position; and having sufficient area to support a person's foot thereon when said wheel is rotated in a direction away from said surface.

5. The step of claim 4 wherein said horizontal surface comprises a flat plate.

6. The step of claim 5 wherein said step is integrally cast onto said knee.

7. The step of claim 5 wherein said horizontal surface extends into a inner wheel area of said wheel when said tractor is in a straight ahead steering position.

8. A service step for a two-wheel drive tractor of the wide front end type having a front axle with substantially vertical knees attached to each end with each knee pivotally supporting a knuckle and king pin assembly with said knuckle extending generally outward with respect to the tractor chassis, said knuckle having a hub and wheel rotatably mounted thereon and its pivotal movement controlled by said king pin extending through said knee and attached above said knee to a rearwardly extending steering arm, said service step comprising a substantially horizontal plate attached to said knee below said front axle with the perimeter of said plate lying entirely outside a front axle clearance area extending between the knees and out of contact with any portion of said hub and wheel in any steering position, and said plate having sufficient horizontal area to support a person's foot thereon when said steering arm is fully rotated toward said tractor.

9. The step of claim 8 wherein said knee slopes outward at its lower end.

10. The step of claim 9 wherein said step is integrally cast to said knee.

11. The step of claim 10 wherein said step is located at the lower end of said knee.

* * * * *